No. 719,534. PATENTED FEB. 3, 1903.
F. TORBECK.
STRAW STACKER.
APPLICATION FILED DEC. 8, 1902.
NO MODEL.
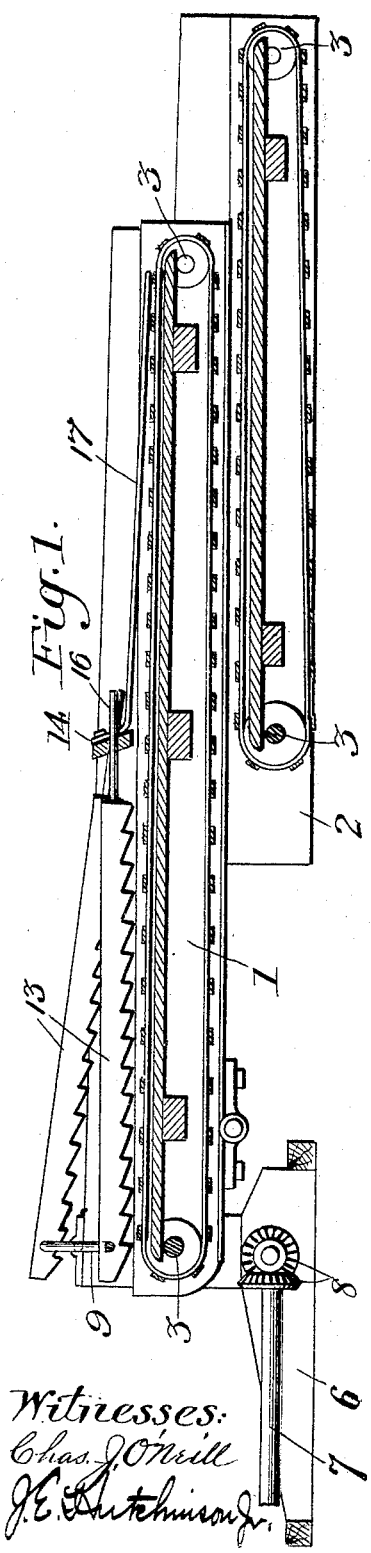
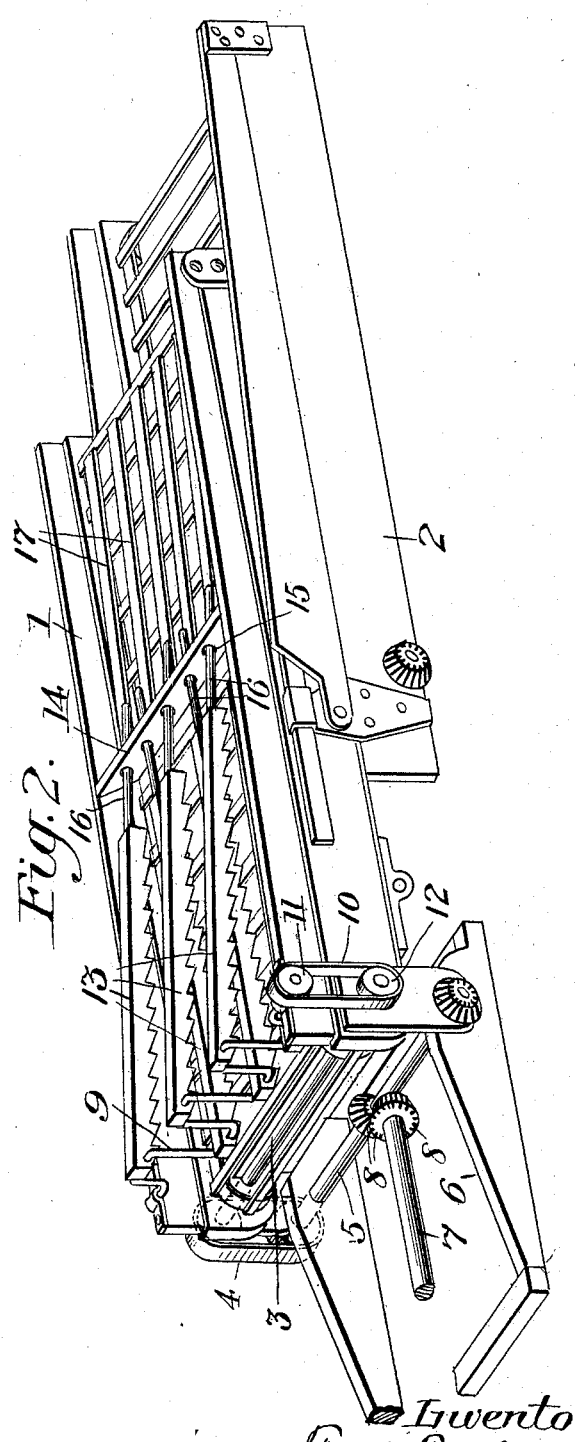
Witnesses:
Chas. J. O'Neill
J. E. Hutchinson Jr.
Inventor.
Fred Torbeck
By his attys.
Pennie & Goldsborough

UNITED STATES PATENT OFFICE.

FRED TORBECK, OF VANDALIA, ILLINOIS.

STRAW-STACKER.

SPECIFICATION forming part of Letters Patent No. 719,534, dated February 3, 1903.

Application filed December 8, 1902. Serial No. 134,320. (No model.)

*To all whom it may concern:*

Be it known that I, FRED TORBECK, a citizen of the United States, residing at Vandalia, county of Fayette, State of Illinois, have invented certain new and useful Improvements in Straw-Stackers; and I do hereby declare the following to be a full, clear, and exact description of the invention, such as will enable others skilled in the art to which it appertains to make and use the same.

This invention relates to straw-stackers adapted for attachment to threshing-machines, and has for its object to increase the carrying and elevating capacity of the stacker, thus making it possible to use carriers of much lighter construction and to permit of the straw being carried up a more abrupt incline. It also has for its object to more evenly distribute the straw upon the elevator-belt and to compress the same thereon, so that it will be carried up the incline without scattering and blowing about.

The invention is illustrated in the accompanying drawings, wherein—

Figure 1 is a longitudinal sectional view of a straw-stacker having my invention applied thereto, and Fig. 2 is a perspective view of the same.

Referring to the drawings, 1 denotes the main carrying-frame, and 2 the supplemental carrying-frame, said frame 2 sliding in and out underneath the main frame and being firmly supported therefrom by means of suitable hangers and brackets, substantially as shown and described in my patent numbered 654,193, dated July 24, 1900. At opposite ends of each frame the apron-carrying rollers 3 are journaled, and around these rollers travel the usual endless elevator-belts. Motion is communicated to the apron-driving roller of the main frame 1 by means of a short belt 4 from a pulley on one end of a counter-shaft 5, which is journaled in the side pieces of the supporting-frame 6. The counter-shaft 5 is in turn driven by a shaft 7, which is suitably connected to the thresher-gearing and extends into the said supporting-frame, where it is connected to the counter-shaft by miter-gears 8.

Journaled in bearings upon the sides of the main apron-carrying frame is a crank-shaft 9, which extends crosswise the frame and is operated by means of a belt 10, which connects the pulley 11, mounted on the crank-shaft, with the pulley 12 on one end of the apron-driving roller 3 of the main frame.

Loosely connected to the crank-shaft are the vibrating slats 13, of which there may be any number, and which are adapted to overhang the lower end of the main carrying-frame. These slats are notched upon their under sides, preferably throughout their length, in order that they may more easily take hold of the straw and greatly assist the apron in carrying and delivering it to the stacks. As the straw passes under the vibrating slats it is caught by them and started up the inclined apron with comparatively little or no difficulty. At the same time the straw is compressed so closely upon the belt that it will adhere thereto and be readily carried up any desired angle.

Extending across the main carrier-frame and arranged in such a position above the belt as to allow the straw to easily pass thereunder is a cross-piece 14, the same being perforated, as at 15, to form guideways for the extensions 16 of the vibrating slats. The slats are thus supported above the carrying-belt at their upper ends by means of this cross-piece and at their lower ends by means of the crank-shank 9, and this loose connection with the cross-piece permits of the slats having a limited movement in the direction of their length, which movement is given them by means of the crank-shaft 9.

As hereinbefore stated, the slats during their operation of lifting the straw and starting it up the incline also compress the straw to a certain degree upon the elevator-belt, whereby it is made to adhere to the belt and is prevented from slipping after leaving the vibrating slats no matter what the inclination of the carrier-belt should be. After such compressing of the straw by the slats provision is also made for further packing of the same by means of the presser-fingers 17, which are secured to the cross-piece 14 by any suitable fastening means. These presser-fingers are preferably made of spring metal, but may be made of wood, in which case they would be fastened to the cross-piece by means of spring-metal straps, so as to allow them to yield to the straw passing under them. This will permit of the straw at all times lying close to the belt and allowing the cross-slats of the belt to more easily take hold of it, thus greatly assisting in the elevating capacity of the carrier. By this arrangement the straw will be distributed more evenly upon the carrying-belt and prevented from bunching, which is a common difficulty in most stackers; also, the straw will be easily started up the incline and is so protected on its way to the stack by means of the slats and the presser-fingers, as hereinbefore described, that all possibility of its being blown about is obviated.

Having thus described my invention, what I claim, and desire to secure by Letters Patent, is—

1. In a stacker, the combination of an apron-carrying frame, a transverse crank-shaft journaled at the lower end of the frame, a cross-piece near the upper end of the frame, feeding-slats overhanging the frame, and journaled at their lower ends on the cranks of the shaft, and having their upper ends mounted to slide in slots or ways in the cross-piece.

2. In a stacker, the combination of an apron-carrying frame, a transverse crank-shaft journaled at the lower end of the frame, a cross-piece near the upper end of the frame, feeding-slats overhanging the frame and journaled at their lower ends on the cranks of the shaft, and having their upper ends mounted to slide in slots or ways in the cross-piece, and yielding presser-fingers secured to the cross-piece and extending lengthwise the frame above the apron.

In testimony whereof I affix my signature in presence of two witnesses.

FRED TORBECK.

Witnesses:
J. C. TORBECK,
CAROLINE MASKE.